Feb. 27, 1940.  R. E. McDONALD ET AL  2,191,893
MACHINE FOR THE PURPOSE OF DESTROYING THE PINK BOLLWORM IN COTTONSEED
Filed Aug. 24, 1939
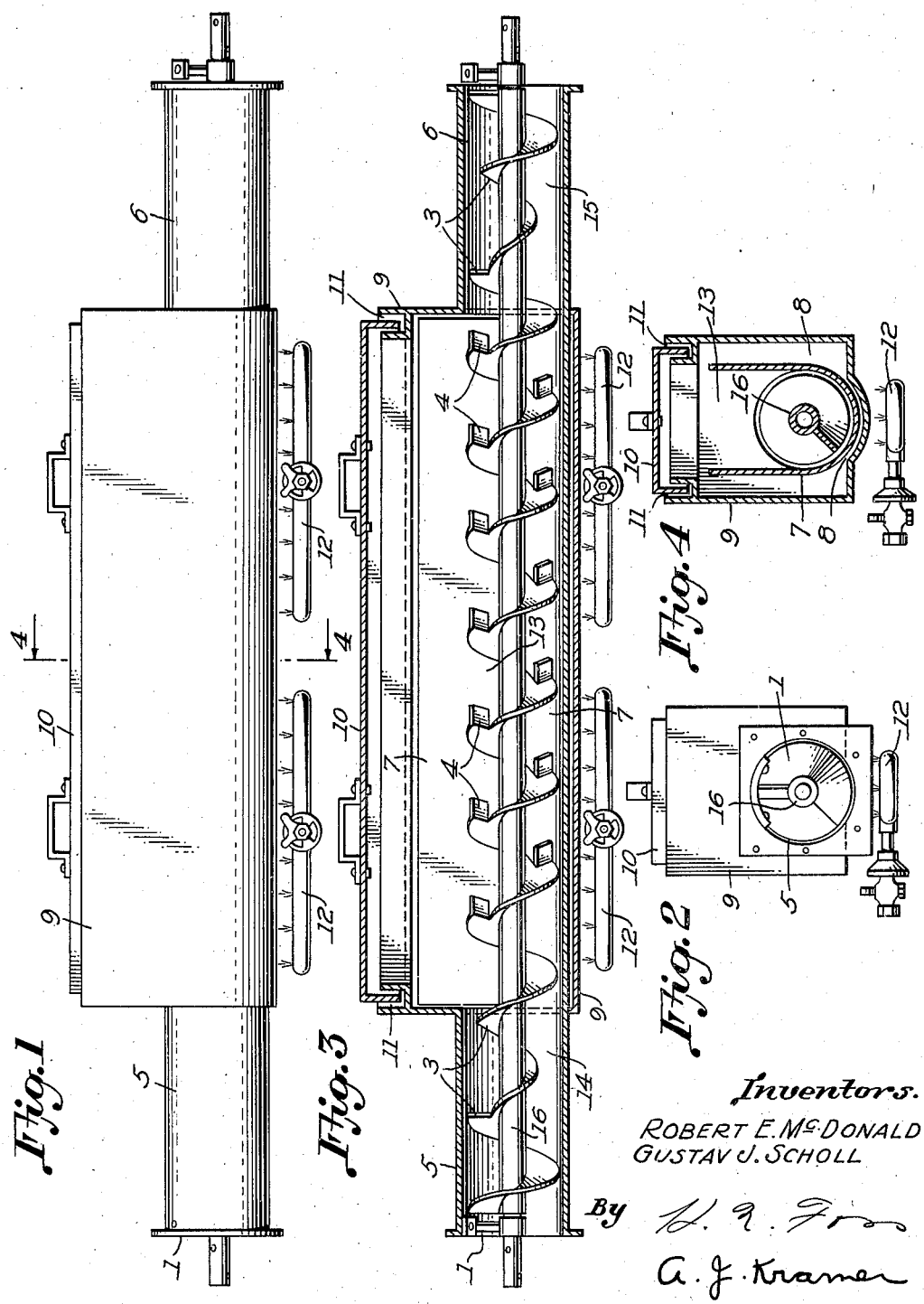
Inventors.
ROBERT E. McDONALD
GUSTAV J. SCHOLL
By
Attorneys.

Patented Feb. 27, 1940

2,191,893

UNITED STATES PATENT OFFICE 2,191,893

MACHINE FOR THE PURPOSE OF DESTROYING THE PINK BOLLWORM IN COTTONSEED

Robert E. McDonald and Gustav J. Scholl, San Antonio, Tex.; dedicated to the free use of the People of the United States of America Application August 24, 1939, Serial No. 291,752

9 Claims. (Cl. 21—94)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

We hereby dedicate the invention herein described to the free use of the people of the United States of America to take effect on the granting of a patent to us.

This invention relates to a machine for eliminating infestations of the pink bollworm in cottonseed.

The pink bollworm is a very destructive insect of cotton and has been recently introduced into the United States. It has a habit of concealing itself in cottonseed and living therein for a long period of time. By thus hiding in the cottonseed, the insect is transported to other localities where it begins other infestations. By the use of this invention, cottonseed can be rendered free from all living pink bollworms, making the cottonseed a safe article of commerce.

It is a well known and established fact that the pink bollworm is killed by heat at a temperature of about 150° F., and that cottonseed is not injured at such temperature. The object of the present invention, therefore, is the provision of a simple and efficient apparatus for the purpose of heating cottonseed to 150° F.

In general, this invention comprises a spiral cottonseed conveyor, operated in a trough, which trough passes through a chamber. The cottonseed is moved forward with this spiral conveyor and is stirred and slowed down in moving by flights cut out of or attached to the conveyor. The application of heat to the heat chamber is accomplished by any convenient method, such as a gas, gasoline, or other type burner set beneath the heat chamber.

The following description, considered together with the accompanying drawing, will disclose this invention more fully, its construction, arrangements and operations of parts, and further objects and advantages thereof will be apparent.

In the drawing:

Figure 1 is a side view of an embodiment of this invention.

Figure 2 is an end view of Figure 1, showing the seed intake.

Figure 3 is a side view of the machine with parts broken away to show the inside structure.

Figure 4 is a cross section along the line 4—4 of Figure 1.

Referring with more particularity to the drawing in which like numerals designate like parts, the point of intake of the cottonseed is designated by the numeral 1. The seed may be introduced by any convenient method, usually by continuation of the conveyor.

The middle section of the device comprises a vertically disposed U-trough 7, to each end of which is attached hollow cylinders 5 and 6, respectively.

Mounted on suitable bearings at the outer ends of the cylinders 5 and 6 is a spiral conveyor, the shaft of which is designated by the numeral 16. A flight is cut out at the end portions of the conveyor, the cut out portions being designated by the numeral 3, one cut being made in each of the cylinders 5 and 6, respectively, substantially as shown, for the purpose of slowing down the movement of the seed and bringing it together in greater volume. The portion of the conveyor screw in the trough 7 is modified by cutting a piece of each flight so that it may be bent at an angle to the blade, making it parallel to the shaft 16 of the conveyor, substantially as shown. In the drawing, these bent portions are designated by the numeral 4.

Around the outside of the trough 7 a housing 9 is disposed, suitable for holding water in the space 8 between it and the trough 7. The top of the housing 9 is open and extend above the top of the trough 7. Below the top edge of the housing 9 and around the inside border thereof, a continuous trough 11 is disposed, substantially as shown, and is adapted to receive a cover 10, having flanges adapted to register with the trough 11. By these means the trough 11 may be filled with a liquid making the housing 9 air-tight.

Beneath the housing 9 and trough 7, heat is applied by any suitable means such as the gas burners 12, illustrated in the drawing.

The space designated by the numeral 14 in the trough 5 is where the seed is bulked on entry, and the space designated by the numeral 15 is where the seed is bulked on exit. The space above the conveyor screw in the trough 7, designated by the numeral 13, constitutes the heat chamber.

In operating this machine, it is desired, as above mentioned, to heat the cottonseed to 150° F. Therefore, the heat is applied through the burners 12 through the bottom of the machine, as shown, thus heating the trough 7, which is preferably of metal, in excess of this temperature. At 212° F. the water in the space 8 will start boiling and thus hold the sides of the trough 7 to that temperature. The temperature of the bottom of the trough will obviously be slightly higher than 212° F. The cottonseed is introduced into the cylinder 5 at the intake 1, and the shaft 16 is rotated, thus causing the cottonseed to move into the trough 7. It is preferable to have the cylinders 5 and 6 as small in diameter as possible, consistent with the proper functioning of the conveyor screw, to prevent undue leakage of heat. As the cottonseed passes through the trough, heat is imparted to it directly from the sides of the trough 7. The air in the space 13, referred to above as the heat chamber, will be heated to a temperature of 212° F. and saturated with water vapor. The cottonseed coming in contact with the highly heated, saturated atmosphere results in condensation on the seed, thus taking from the air and delivering to the seed the latent heat of evaporation. Such condensation not only heats the seed to some extent, but also moistens it slightly, thus breaking down the insulation caused by the fuzz on the outside of the seed, enabling the heated metal to impart to the seed a temperature up to 150° F.

The temperature to which the seed is to be heated is regulated by the time of exposure, which is in turn regulated by the speed of rotation of the conveyor screw. The temperature inside the machine is easily kept uniform at all times through the water chamber so that the speed of the machine may be calibrated for different temperatures.

Having thus described our invention, we claim:

1. A machine of the character described comprising a trough, conveying means through said trough, means for continuously introducing material into and discharging it from said trough, a housing for said trough, said housing forming a space between it and each wall of said trough, said spaces communicating with said trough and being adapted to hold a liquid, and means for heating said trough and liquid.

2. A machine of the character described comprising a trough, adjustable conveying means through said trough, means for continuously introducing material into and discharging it from said trough, a housing for said trough, said housing forming a space between it and each wall of said trough, said spaces communicating with said trough and being adapted to hold a liquid, and means for heating said trough and liquid.

3. A machine of the character described comprising a trough, conveying means through said trough, means for continuously introducing material into and discharging it from said trough, a housing for said trough, said housing forming a space between it and each wall of said trough, said spaces communicating with said trough and being adapted to hold a liquid, means for hermetically sealing said housing, and means for heating said trough and liquid.

4. A machine of the character described comprising a trough, conveying means through said trough, means for continuously introducing material into and discharging it from said trough, a housing for said trough, said housing forming a space between it and each wall of said trough, said spaces communicating with said trough and being adapted to hold a liquid, removable means for hermetically sealing said housing, and means for heating said trough and liquid.

5. A machine of the character described comprising a trough, adjustable conveying means through said trough, means for continuously introducing material into and discharging it from said trough, a housing for said trough, said housing forming a space between it and each wall of said trough, said spaces communicating with said trough and being adapted to hold a liquid, means for hermetically sealing said housing, and means for heating said trough and liquid.

6. A machine of the character described comprising a trough, adjustable conveying means through said trough, means for continuously introducing material into and discharging it from said trough, a housing for said trough, said housing forming a space between it and each wall of said trough, said spaces communicating with said trough and being adapted to hold a liquid, removable means for hermetically sealing said housing, and means for heating said trough and liquid.

7. An article of manufacture comprising a trough, conveying means through said trough, means for continuously introducing material into and discharging it from said trough, a housing for said trough, said housing forming a space between it and each wall of said trough, said spaces communicating with said trough and being adapted to hold a liquid, said housing having a surface where external heat may be applied and transferred to said spaces and trough.

8. A machine of the character described comprising a trough, a conveyor screw in said trough for moving cottonseed therethrough, means for continuously introducing material into and discharging it from said trough, a housing for said trough, said housing forming a space between it and each wall of said trough, said spaces communicating with said trough and being adapted to hold a liquid, and means for heating said trough and liquid.

9. The device defined by claim 1 in which the conveying means and the means for continuously introducing material into and discharging it from the trough comprise a conveyor screw extending longitudinally through the trough and projecting from each end thereof, a housing for each of the projecting ends of the conveyor screw, a portion of each projecting end of the conveyor screw having cut-out flights, that portion of the conveyor screw in the trough also having cut-out flights and lips adjacent to the cut portions parallel to the axis of the conveyor screw.

ROBERT E. McDONALD.
GUSTAV J. SCHOLL.